United States Patent
Hwang et al.

(10) Patent No.: US 12,553,635 B2
(45) Date of Patent: Feb. 17, 2026

(54) AIR CONDITIONER AND CONTROLLING METHOD THEREOF

(71) Applicant: SAMSUNG ELECTRONICS CO., LTD., Suwon-si (KR)

(72) Inventors: Jun Hwang, Suwon-si (KR); Sangwoo Lee, Suwon-si (KR); Sungjin Lim, Suwon-si (KR); Hyeongkyu Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 105 days.

(21) Appl. No.: 18/444,082

(22) Filed: Feb. 16, 2024

(65) Prior Publication Data

US 2024/0183562 A1    Jun. 6, 2024

Related U.S. Application Data

(63) Continuation of application No. PCT/KR2023/019346, filed on Nov. 28, 2023.

(30) Foreign Application Priority Data

Nov. 29, 2022 (KR) .................. 10-2022-0162886

(51) Int. Cl.
F24F 11/74 (2018.01)
F24F 11/63 (2018.01)

(52) U.S. Cl.
CPC ............ F24F 11/74 (2018.01); F24F 11/63 (2018.01)

(58) Field of Classification Search
CPC .. F24F 11/43; F24F 11/41; F24F 11/63; F24F 11/62; F24F 11/64; F25B 47/02
See application file for complete search history.

(56) References Cited

U.S. PATENT DOCUMENTS

| | | | |
|---|---|---|---|
| 2013/0098074 A1* | 4/2013 | Hegedus | F25D 21/08 62/151 |
| 2022/0316732 A1* | 10/2022 | Son | F24F 11/63 |
| 2023/0093074 A1 | 3/2023 | Joo et al. | |

FOREIGN PATENT DOCUMENTS

| | | |
|---|---|---|
| CN | 105299949 A | 2/2016 |
| CN | 110848920 A | 2/2020 |

(Continued)

OTHER PUBLICATIONS

Search Report dated Mar. 5, 2024 issued by the ISA for International Application No. PCT/KR2023/019346.

(Continued)

*Primary Examiner* — Lionel Nouketcha
(74) *Attorney, Agent, or Firm* — STAAS & HALSEY LLP

(57) ABSTRACT

An air conditioner including an indoor unit including an indoor heat exchanger and an indoor fan; an outdoor unit including a compressor; and a processor configured to, based on identification of an event occurring for cleaning the indoor heat exchanger, control a heat-up operation to be performed to increase a temperature of a surface of the indoor heat exchanger, control at least one from among the indoor fan and the compressor to perform a pre-freezing operation to form dew at the surface of the indoor heat exchanger, control at least one from among the indoor fan and the compressor to perform a freezing operation to freeze the dew formed at the surface of the indoor heat exchanger to form an ice-capsule at the surface of the indoor heat exchanger, and control the indoor fan to perform a defrosting operation to defrost the surface of the indoor heat exchanger.

13 Claims, 11 Drawing Sheets

(56) References Cited

FOREIGN PATENT DOCUMENTS

| | | | |
|---|---|---|---|
| CN | 111503832 A | 8/2020 | |
| EP | 1 826 501 B1 | 12/2017 | |
| EP | 3 611 446 A1 | 2/2020 | |
| EP | 3 617 609 A1 | 3/2020 | |
| JP | 6387197 | 9/2018 | |
| JP | 2018-200127 | 12/2018 | |
| JP | 2019-109043 A | 7/2019 | |
| JP | 2020-115063 A | 7/2020 | |
| JP | 2021-135006 | 9/2021 | |
| JP | 6945100 | 9/2021 | |
| JP | 6945100 B1 * | 10/2021 | ............. F24F 11/48 |
| JP | 2022-41710 | 3/2022 | |
| KR | 10-0200785 B1 | 6/1999 | |
| KR | 10-2005-0032667 A | 4/2005 | |
| KR | 10-0557253 B1 | 3/2006 | |
| KR | 10-2008-0043552 | 5/2008 | |
| KR | 10-1320776 B1 | 10/2013 | |
| KR | 10-2021-0087291 | 7/2021 | |
| KR | 20210087291 A * | 7/2021 | ............. F24F 11/83 |
| KR | 10-2022-0008427 | 1/2022 | |
| KR | 10-2022-0029476 | 3/2022 | |

OTHER PUBLICATIONS

Written Opinion dated Mar. 5, 2024 issued by the ISA for International Application No. PCT/KR2023/019346.

Extended European Search Report dated Nov. 17, 2025 issued by the European Patent Office for European Patent Application No. 23898264.9.

* cited by examiner

FIG. 10

| | FROST GENERATION AMOUNT | AMOUNT OF CONDENSED WATER OUTPUT | FREEZING TIME | AMOUNT OF MIST | THERMAL CONTRACTION AND EXPANSION NOISE |
|---|---|---|---|---|---|
| FREEZING RPM ↑ | INCREASE | INCREASE | INCREASE | INCREASE | DECREASE |
| FREEZING RPM ↓ | DECREASE | DECREASE | DECREASE | DECREASE | INCREASE |

AIR CONDITIONER AND CONTROLLING METHOD THEREOF

CROSS-REFERENCE TO RELATED APPLICATIONS

This application is a continuation of International Application No. PCT/KR2023/019346 designating the United States, filed on Nov. 28, 2023, in the Korean Intellectual Property Receiving Office and claiming priority to Korean Patent Application No. 10-2022-0162886 filed on Nov. 29, 2022, in the Korean Intellectual Property Office. The disclosures of each of these applications are incorporated by reference herein in their entireties.

BACKGROUND

1. Field

The disclosure relates to an air conditioner and a controlling method of the air conditioner, and more particularly, to an air conditioner capable of effectively performing cleaning of a heat exchanger included in an indoor unit of the air conditioner and a controlling method thereof.

2. Description of the Related Art

Recently, developments in technology associated with air conditioners are showing a steady growing trend, and specifically, user needs and industry demand for air conditioners capable of not only maintaining indoor air to a most suitable temperature according to use or purpose, but also capable of adjusting the indoor air to a comfortable and clean state simultaneously are increasing.

Specifically, a heat exchanger included in an indoor unit of an air conditioner may have contaminants included in air which are suctioned by an indoor fan and easily attached to a surface of the heat exchanger or have mold growing on the surface thereof, and accordingly, an odor may be induced by condensed water generated at the surface of the heat exchanger when in a cooling operation. Specifically, among the above, when microbial growth such as mold occurs in the heat exchanger, there is an increasing need for technology to effectively remove the above.

Based on the above, although technology of related art that performs a blowing operation when ending the cooling operation is present, a main object of the above lies in drying the surface of the heat exchanger included in the indoor unit and an inside of the indoor unit rather than cleaning the heat exchanger included in the indoor unit and thereby, there is a limit in expecting a cleaning effect of discharging the contaminants attached to the surface of the heat exchanger included in the indoor unit to the outside.

In addition, although technology of related art that performs a heating operation when ending the cooling operation is present, because an object of the above simply lies in a killing of mold and in heating itself, there is a limit to effectively discharging the killed mold to the outside of the indoor unit.

SUMMARY

Aspects of embodiments of the disclosure will be set forth in part in the description which follows and, in part, will be apparent from the description, or may be learned by practice of the presented embodiments.

According to an embodiment of the disclosure, an air conditioner includes an indoor unit including an indoor heat exchanger and an indoor fan; an outdoor unit including a compressor; and a processor configured to, based on identification of an event occurring for cleaning the indoor heat exchanger, control a heat-up operation to be performed to increase a temperature of a surface of the indoor heat exchanger, control at least one from among the indoor fan and the compressor to perform a pre-freezing operation to form dew at the surface of the indoor heat exchanger, control at least one from among the indoor fan and the compressor to perform a freezing operation to freeze the dew formed at the surface of the indoor heat exchanger to form an ice-capsule at the surface of the indoor heat exchanger, and control the indoor fan to perform a defrosting operation to defrost the surface of the indoor heat exchanger.

According to an embodiment of the disclosure, the processor may be configured to control the indoor fan to not rotate while the heat-up operation is being performed.

According to an embodiment of the disclosure, the processor may be configured to control the compressor to rotate at a first compressor revolution per minute (RPM) while the pre-freezing operation is being performed, and control the compressor to rotate at a second compressor RPM which is greater than the first compressor RPM while the freezing operation is being performed.

According to an embodiment of the disclosure, the processor may be configured to control the indoor fan to rotate at a first fan RPM while the pre-freezing operation is being performed, and control the indoor fan to rotate at a second fan RPM which is less than the first fan RPM while the freezing operation is being performed.

According to an embodiment of the disclosure, the processor may be configured to, based on the identification of an event occurring for cleaning the indoor heat exchanger, identify whether a pre-set threshold time has passed after a cooling operation or a dehumidifying operation is ended, and, based on the pre-set threshold time being identified as having passed, control the heat-up operation to be performed, or, based on the pre-set threshold time being identified as not having passed, control a drying operation to be performed to dry the indoor heat exchanger, and then control the heat-up operation to be performed.

According to an embodiment of the disclosure, the outdoor unit may include a cooling and heating switch valve to switch a direction in which a refrigerant flows. The processor may be configured to control the compressor and the cooling and heating switch valve to perform the heat-up operation.

According to an embodiment of the disclosure, the indoor unit may include a heater to heat the indoor heat exchanger. The processor may be configured to control the heater to perform the heat-up operation.

According to an embodiment of the disclosure, the processor may be configured to, based on the heat-up operation being ended, performing a standby operation for a pre-set threshold time before controlling the pre-freezing operation to be performed.

According to an embodiment of the disclosure, the processor may be configured to perform a drying operation to dry the indoor heat exchanger after the defrosting operation is ended.

According to an embodiment of the disclosure, the event may include at least one from among humidity in a space in which the indoor unit is disposed being greater than a pre-set threshold humidity, a foreign material inside the air conditioner being detected through at least one sensor in the air conditioner, an odor of a pre-set type being detected through the at least one sensor, and a pre-set cleaning cycle having arrived.

According to an embodiment of the disclosure, provided is a method of controlling an air conditioner including an indoor unit including an indoor heat exchanger and an indoor fan, and an outdoor unit including a compressor, the method including identifying an event occurring for cleaning the indoor heat exchanger; performing a heat-up operation to increase a temperature of a surface of the indoor heat exchanger; controlling at least one from among the indoor fan and the compressor to perform a pre-freezing operation to form dew at the surface of the indoor heat exchanger; controlling at least one from among the indoor fan and the compressor to perform a freezing operation to freeze the dew formed at the surface of the indoor heat exchanger to form an ice-capsule at the surface of the indoor heat exchanger; and controlling the indoor fan to perform a defrosting operation to defrost the surface of the indoor heat exchanger.

According to an embodiment of the disclosure, the performing the heat-up operation may include controlling the indoor fan to not rotate while the heat-up operation is being performed.

According to an embodiment of the disclosure, the controlling at least one from among the indoor fan and the compressor to perform the pre-freezing operation may include controlling the compressor to rotate at a first compressor revolution per minute (RPM) while the pre-freezing operation is being performed. The controlling at least one from among the indoor fan and the compressor to perform the freezing operation may include controlling the compressor to rotate at a second compressor RPM which is greater than the first compressor RPM while the freezing operation is being performed.

According to an embodiment of the disclosure, the controlling at least one from among the indoor fan and the compressor to perform the pre-freezing operation may include controlling the indoor fan to rotate at a first fan RPM while the pre-freezing operation is being performed. The controlling at least one from among the indoor fan and the compressor to perform the freezing operation may include controlling the indoor fan to rotate at a second fan RPM which is lesser than the first fan RPM while the freezing operation is being performed.

According to an embodiment of the disclosure, the method may further include identifying, based on the identifying an event occurring for cleaning the indoor heat exchanger, whether a pre-set threshold time has passed after a cooling operation or a dehumidifying operation is ended, and, based on the pre-set threshold time being identified as having passed, performing the heat-up operation; or, based on the pre-set threshold time being identified as not having passed, performing a drying operation to dry the indoor heat exchanger, and then performing the heat-up operation.

BRIEF DESCRIPTION OF THE DRAWINGS

These and/or other embodiments of the disclosure will become apparent and more readily appreciated from the following description of embodiments, taken in conjunction with the accompanying drawings of which:

FIG. 10 and FIG. 11 are diagrams illustrating factors that can affect a decision in a freezing RPM according to the disclosure.

DETAILED DESCRIPTION

Figure 1:
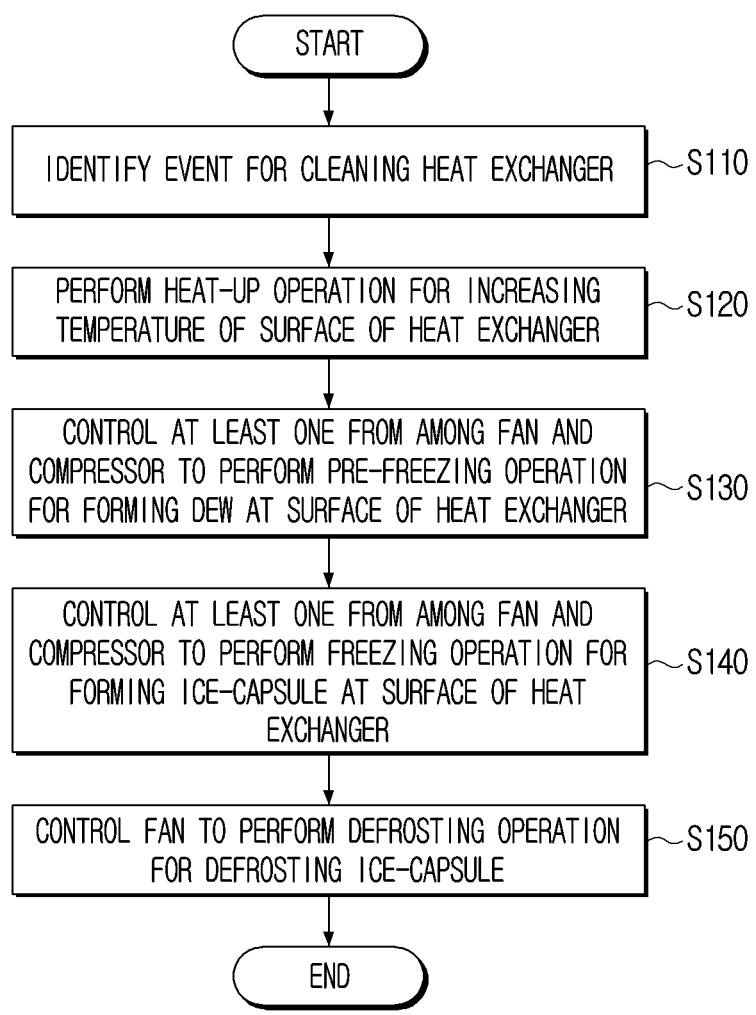
FIG. 1 is a flowchart illustrating a controlling method of an air conditioner according to one or more embodiments.

Various modifications may be made to one or more embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. With respect to the description of the drawings, like reference numerals may be used to indicate like elements.

In describing the disclosure, in case it is determined that the detailed description of related known technologies may unnecessarily confuse the gist of the disclosure, the detailed description thereof will be omitted.

Further, the one or more embodiments below may be modified to various different forms, and it is to be understood that the scope of the technical spirit of the disclosure is not limited to the embodiments below. Rather, the embodiments are provided so that the disclosure will be thorough and complete, and to fully convey the technical spirit of the disclosure to those skilled in the art.

Terms used in the disclosure have been used merely to describe a specific embodiment, and is not intended to limit the scope of protection. A singular expression includes a plural expression, unless otherwise specified.

In the disclosure, expressions such as "have," "may have," "include," "may include," or the like are used to designate a presence of a corresponding characteristic (e.g., elements such as numerical value, function, operation, or component), and not to preclude a presence or a possibility of additional characteristics.

In the disclosure, expressions such as "A or B," "at least one of A and/or B," or "one or more of A and/or B" may include all possible combinations of the items listed together. For example, "A or B," "at least one of A and B," or "at least one of A or B" may refer to all cases including (1) at least one A, (2) at least one B, or (3) both of at least one A and at least one B.

Expressions such as "first," "second," "1st," "2nd," and so on used herein may be used to refer to various elements regardless of order and/or importance. Further, it should be noted that the expressions are merely used to distinguish an element from another element and not to limit the relevant elements.

When a certain element (e.g., first element) is indicated as being "(operatively or communicatively) coupled with/to" or "connected to" another element (e.g., second element), it may be understood as the certain element being directly coupled with/to the another element or as being coupled through other element (e.g., third element).

On the other hand, when a certain element (e.g., first element) is indicated as "directly coupled with/to" or "directly connected to" another element (e.g., second element), it may be understood as the other element (e.g., third element) not being present between the certain element and the another element.

The expression "configured to . . . (or set up to)" used in the disclosure may be used interchangeably with, for example, "suitable for . . . ," "having the capacity to . . . ," "designed to . . . ," "adapted to . . . ," "made to . . . ," or "capable of . . . " based on circumstance. The term "configured to . . . (or set up to)" may not necessarily mean "specifically designed to" in terms of hardware.

Rather, in a certain circumstance, the expression "a device configured to . . . " may mean something that the device "may perform . . . " together with another device or components. For example, the phrase "a processor configured to (or set up to) perform A, B, or C" may mean a dedicated processor for performing a corresponding operation (e.g., embedded processor), or a generic-purpose processor (e.g., a central processing unit (CPU) or an application processor) capable of performing the corresponding operations by executing one or more software programs stored in a memory device.

The term "module" or "part" used in one or more embodiments herein perform at least one function or operation, and may be implemented with a hardware or software, or implemented with a combination of hardware and software. Further, a plurality of "modules" or a plurality of "parts," except for a "module" or a "part" which needs to be implemented to a specific hardware, may be integrated to at least one module and implemented in at least one processor.

Meanwhile, the various elements and areas of the drawings have been schematically illustrated. Accordingly, the technical idea of the disclosure is not limited by relative sizes and distances illustrated in the accompanied drawings.

Embodiments of the disclosure may overcome various limitations in the related art such as those as described above, and an aspect of the disclosure is to provide an air conditioner capable of effectively performing cleaning of a heat exchanger included in an indoor unit of the air conditioner and a controlling method thereof.

One or more embodiments of the disclosure will be described in detail with reference to the accompanying drawings to aid in the understanding of those of ordinary skill in the art.

FIG. 1 is a flowchart illustrating a controlling method of an air conditioner 100 according to one or more embodiments.

The 'air conditioner 100' according to the disclosure refers to an apparatus for maintaining indoor air to a most suitable state according to use and purpose. Specifically, the air conditioner 100 may adjust indoors to a cool cooling state, adjust humidity of the indoors, and adjust the indoor air to a comfortable and clean state. In addition, when the air conditioner 100 is implemented such that not only a cooling function but also a heating function can be performed, the air conditioner 100 may adjust the indoors to a warm heating state.

Specifically, the air conditioner 100 may be implemented as a separable air conditioner 100 which includes an outdoor unit 120 installed outdoors and an indoor unit 110 installed indoors. Although the disclosure is not applicable to only the separable air conditioner 100, but to clearly describe the various embodiments according to the disclosure, the above will be described assuming the separable air conditioner 100. However, the various embodiments according to the disclosure are not applicable to only the separable air conditioner 100.

Referring to FIG. 1, the air conditioner 100 according to the disclosure may identify an event for cleaning a heat exchanger (S110). Here, 'event' may be used as a term for collectively referring to all situations that fit a condition of starting a cleaning operation of the heat exchanger according to the disclosure.

Specifically, the event may include at least one from among when humidity in a space in which the indoor unit 110 is disposed is greater than or equal to a pre-set threshold humidity, when a foreign material is detected inside the air conditioner 100, when an odor of a pre-set type is detected, and when a pre-set cleaning cycle has arrived. In addition to the above, when a replacement cycle of a filter included in the air conditioner 100 has arrived or when it is a first operation after installation of the air conditioner 100, various situations such as when it is an operation after not having operated for a pre-set period may be included in the event according to the disclosure.

Meanwhile, the humidity, foreign material, odor, and the like in the example above may be detected through at least one sensor included in the air conditioner 100 or an external apparatus, and a cleaning cycle and a replacement cycle of the filter, and the like, may be set by a developer or a user.

According to one or more embodiments, the air conditioner 100 may identify, based on indoor humidity detected through at least one sensor being greater than or equal to a pre-set threshold humidity, as the event for cleaning the heat exchanger according to the disclosure having occurred (or having been generated). For example, a threshold humidity may be 60%, and temperature (indoor temperature and/or heat exchanger temperature), illuminance, or the like may be an event occurring criterion in addition to the humidity. When humidity, temperature, illuminance, and the like become the criterion (threshold value) of the event occurring, the criterion may be determined based on the humidity, the temperature, the illuminance, and the like that becomes an environment in which mold may grow.

In addition, the air conditioner 100 may identify, based on an odor of a pre-set type being detected through at least one sensor or a foreign material (e.g., mold) being detected inside the air conditioner 100, as the event for cleaning the heat exchanger according to the disclosure having occurred.

Meanwhile, the event may be identified based on a user input. For example, when a user input for performing the cleaning operation of the heat exchanger is received, the air conditioner 100 may identify that the event for cleaning the heat exchanger has occurred. Here, the user input may be input through various methods such as, for example, and without limitation, a touch input received through a touch screen, a button input received through a physical button, a voice signal received through a microphone, or the like.

When the event for cleaning the heat exchanger is identified, the air conditioner 100 may perform a heat-up operation for increasing the temperature of the surface of the heat exchanger 112 indoors (S120). Here, the 'heat-up operation' may be used as a term that collectively refers to an operation for increasing the temperature of the surface of the heat exchanger 112 indoors to sterilize the heat exchanger. For example, a target of sterilization according to the disclosure may be varied, but may include mold or oil which are targets that are easy to remove especially when heated.

The sterilization effect may be improved as the temperature is increased when at the heat-up operation, but because reliability of hardware configurations may be deteriorated if the temperature is raised excessively high, the temperature and time at the heat-up operation may be determined based on the sterilization effect according to the heat-up operation and heat resistance of the hardware configurations included in the air conditioner 100. For example, the air conditioner 100 may perform the heat-up operation such that the heat exchanger is heated for 5 minutes at a temperature of 60 degrees Celsius to 65 degrees Celsius, but this is merely one example.

Meanwhile, the specific embodiment of the heat-up operation may vary according to which configuration is to be used in heating the heat exchanger is included in the air conditioner 100. For example, when the air conditioner 100 is implemented such that not only a cooling operation but also a heating operation is possible, the heat exchanger may be heated by performing the heating operation, and when the air conditioner 100 includes a separate heater 113 for heating the heat exchanger, the heat-up operation may be performed by controlling the separate heater 113. One or more embodiments about performing the heat-up operation using which configuration will be described in greater detail with reference to FIG. 4 to FIG. 7.

After the heat-up operation is performed, the air conditioner 100 may control at least one from among an indoor fan 111 and a compressor 121 to perform a pre-freezing operation for forming dew at the surface of the heat exchanger (S130). Here, the 'pre-freezing operation' may be an operation for forming dew at the surface of the heat exchanger, and may refer to an operation for causing a more effective freezing. That is, the pre-freezing operation may be referred to as a pre-freezing operation (or a pre-operation to freezing) differentiated from a freezing operation in that it is an operation for causing freezing effectively according to the freezing operation described below, and may be omitted according to the embodiment.

The pre-freezing operation may be defined according to a revolution per minute (or rotation per minute (RPM)) of the compressor 121 and a freezing RPM. Specifically, the pre-freezing operation may be an operation in which the compressor 121 is rotated at a first RPM of the compressor 121 (or first compressor RPM), and may be an operation in which the compressor 121 is rotated at the first compressor RPM and the indoor fan 111 is rotated at a first RPM of a fan (first fan RPM).

The first fan RPM, the first compressor RPM and an operation time according to the pre-freezing operation may be set such that freezing is effectively carried out by checking whether a normal operation of the air conditioner 100 is possible, and forming dew on the surface of the heat exchanger. Specifically, it may be preferable for the first fan RPM to be set taking into consideration that an object of a pre-freezing mode is easily achievable due to accuracy in detecting air state quantity being improved as a flow rate of a refrigerant is decreased.

For example, the first fan RPM may be set within a range of 15 Hz to 20 Hz, the first compressor RPM may be set within a range of 5 Hz to 15 Hz, and the operation time according to the pre-freezing operation may be set within 2 to 3 minutes. However, numerical ranges as described above are merely examples, and may be set to a numerical range different from the example above so long as it is within a range for achieving an object of the disclosure.

After the pre-freezing operation is performed, the air conditioner 100 may control at least one from among the indoor fan 111 and the compressor 121 to perform the freezing operation for forming an ice-capsule at the surface of the heat exchanger (S140). Here, the 'freezing operation' may be an operation for forming the ice-capsule at the surface of the heat exchanger, and may be defined according to the compressor RPM and the freezing RPM.

Specifically, the freezing operation may be an operation in which the compressor 121 is rotated at a second RPM of the compressor 121 (or second compressor RPM) which is greater than the first compressor RPM, and may be an operation in which the compressor 121 is rotated at the second compressor RPM which is greater than the first compressor RPM and the indoor fan 111 is rotated at a second RPM of the fan (or second fan RPM) which is less than or equal to the first fan RPM. However, the above is not limited thereto, and the second fan RPM, the second compressor RPM, and an operation time according to a first freezing mode may be set such that the ice-capsule is effectively formed substantially on the surface of the heat exchanger 112 indoors. According to one or more embodiments, an operation of the indoor fan 111 may be stopped while the freezing operation being performed.

Specifically, if the second fan RPM is too high, frost generation of the ice-capsule may not occur due to a surface temperature of the heat exchanger not falling to 0 degrees Celsius or lower, and if the second fan RPM is too low, a freezing mode release condition may be reached quickly and rather the frost generation amount may be decreased and thus, it may be preferable for the second fan RPM to be set taking into consideration factors as described above.

Meanwhile, it may be preferable for the second compressor RPM to be set to a higher RPM than the first compressor RPM in that a second freezing mode is a mode for substantially freezing the indoor heat exchanger 112. However, the specific numerical range may be determined differently according to an exhaust amount of the compressor 121 applicable, or the like.

Meanwhile, the temperature and time at the freezing operation may be determined based on a freezing effect according to the freezing operation and heat resistance of the hardware configurations included in the air conditioner 100. For example, the air conditioner 100 may perform the freezing operation for the heat exchanger to be frozen for 12 minutes to 15 minutes at a temperature of negative 15 degrees Celsius to negative 10 degrees Celsius, but the above is merely one example. The frost generation amount of the ice-capsule may be proportionate to an operation time according to the second freezing mode, but when operating for a long time, it may be preferable to set the operation time according to the second freezing mode taking into consideration that a guaranteed pressure range for each operation condition of the compressor 121 applicable can be exceeded.

The air conditioner 100 may control at least one from among the indoor fan 111 and the compressor 121 to perform a defrosting operation for defrosting the ice-capsule (S150). Here, the 'defrosting operation' may be an operation for defrosting the ice-capsule formed according to the pre-freezing operation and the freezing operation, and when the ice-capsule formed on the surface of the heat exchanger is defrosted according to the defrosting operation, condensed water may be discharged outside the indoor unit 110 together with foreign materials such as mold attached to the surface thereof.

Specifically, in the defrosting operation, the compressor 121 may be stopped and the indoor fan 111 may be operated, and accordingly, the surface temperature of the indoor heat exchanger 112 may be increased. Specifically, while an operation is being performed according to the freezing mode, a temperature at which cool air which is being discharged may drop to a level of 0 degrees Celsius, and accordingly, because condensed water is generated in large quantities by a dew condensation due to the surface temperatures of an exterior and interior of the indoor unit 110 being formed at less than or equal to a dew-point temperature, the air conditioners 100 may require the interior and exterior thereof to be fully dried through an operation according to the defrosting operation. Accordingly, after the defrosting operation is performed, a drying operation as described below may be performed.

The defrosting operation may be defined according to a number of times the indoor fan 111 is rotated. An RPM of the indoor fan 111 (or indoor fan 111 RPM) at the defrosting operation may be referred to as a third fan RPM below to differentiate from the indoor fan 111 RPM at the pre-freezing operation and the freezing operation. Then, the third fan RPM and an operation time according to the defrosting operation may be set such that condensed water can be formed by effectively defrosting the ice-capsule formed on the surface of the indoor heat exchanger 112. For example, the third fan RPM may be set to a minimum RPM of the indoor fan 111 to minimize an occurrence of a mist phenomenon and an expansion noise which can occur at a time-point at which an operation according to the defrosting operation is started after an operation according to the freezing operation is ended, but is not limited to the above.

Meanwhile, the pre-freezing operation, the freezing operation, and the defrosting operation described in the above may be included and collectively referred to as a 'freeze cleaning operation', and the term freeze cleaning operation may be used as a term for collectively referring to a series of operations performed after the heat-up operation and may include the drying operation which will be described below according to one or more embodiments.

According to the one or more embodiments described above with reference to FIG. 1, the air conditioner 100 may be able to effectively perform, by performing the heat-up operation together with the freeze cleaning operation, cleaning of the heat exchanger. Specifically, according to the disclosure, mold may be effectively killed by performing the heat-up operation, and by separating the contaminants attached to the surface of the heat exchanger by freezing the heat exchanger and forming and freezing the ice-capsule thereafter, and then, discharging the condensed water formed according to defrosting the ice-capsule thereafter to the outside of the indoor unit 110, the contaminants attached to the surface of the heat exchanger may be effectively removed.

Figure 2:
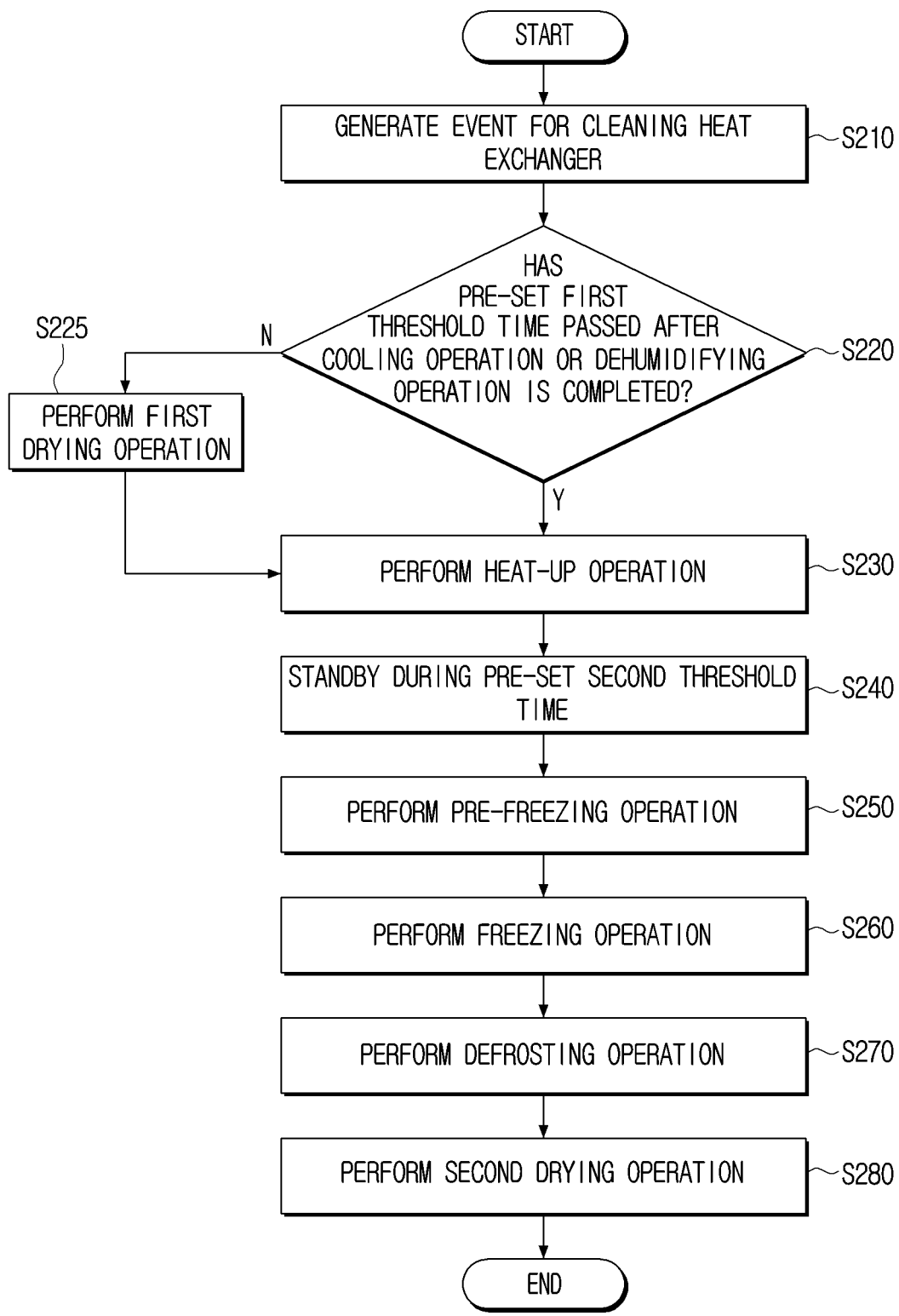
FIG. 2 is a flowchart illustrating in detail a controlling method of an air conditioner according to one or more embodiments.

FIG. 2 is a flowchart illustrating in detail a controlling method of the air conditioner 100 according to one or more embodiments.

Because the generation of the event, the heat-up operation, the pre-freezing operation, the freezing operation, and the defrosting operation according to the disclosure have been described with reference to FIG. 1, redundant descriptions of the same will be omitted below, and a first drying operation, a second drying operation, a standby operation, and the like according to the disclosure will be described.

Referring to FIG. 2, the air conditioner 100 may identify the event for cleaning the heat exchanger (S210). Then, when the event for cleaning the heat exchanger is identified, the air conditioner 100 may identify whether a pre-set first threshold time has passed after the cooling operation or a dehumidifying operation is ended (S220).

In describing the disclosure, the 'cooling operation' may be an operation for adjusting a space in which the indoor unit 110 is disposed to a cool cooling state, and may be substituted with terms such as a 'chilling operation', and may be used as a meaning that includes operations such as the 'dehumidifying operation.'

The 'first threshold time' may refer to a time set as a criterion for identifying whether an internal temperature of the indoor unit 110 has sufficiently risen after the cooling operation or the dehumidifying operation is ended. For example, the first threshold time may be 60 minutes, and may be changed according to a setting of a developer or a user.

When the first threshold time is identified as having passed (S220-Y), the air conditioner 100 may perform the heat-up operation (S230). Specifically, when the first threshold time is identified as having passed, the air conditioner 100 may perform the heat-up operation for increasing a temperature of the surface of the indoor heat exchanger 112. Because the specific operation at the heat-up operation has been described above in the description of FIG. 1, redundant description of the same will be omitted.

Alternatively, if the first threshold time is identified as not having passed (S220-N), the heat-up operation may be performed (S230) after performing the first drying operation for drying the heat exchanger (S225).

Specifically, if the heat-up operation is performed without sufficient time being passed after the cooling operation or the dehumidifying operation is ended, there is concern of smoke or an unpleasant odor being generated as the heat exchanger is suddenly heated in a chilled state. Accordingly, the air conditioner 100 according to the disclosure may identify whether the first threshold time has passed after the cooling operation or the dehumidifying operation is ended, and perform, based on the first threshold time not having passed, the first drying operation for drying the inside (S225). Here, the 'first drying operation' may be an operation for drying the inside of the indoor unit 110, and for example, may be an operation which rotates the indoor fan 111 for 15 minutes at a pre-set maximum wind. The RPM of the indoor fan 111 and an operation time according to the first drying operation may be determined according to the humidity in the space in which the indoor unit 110 is positioned. At this time, the compressor may be in a stopped state without being rotated. In another example, the first drying operation may be an operation of rotating the indoor fan 111 while a discharge port which includes a blade and a door is blocked such that smoke or an unpleasant odor is not leaked into a space in which the user stays.

After the heat-up operation is performed, the air conditioner 100 may perform the pre-freezing operation after having been in standby for a pre-set second threshold time (S240). That is, the air conditioner 100 may control, by starting the pre-freezing operation after having been in standby for sufficient time after the heat-up operation is ended, at least one from among the indoor fan 111 and the compressor 121 to perform the pre-freezing operation for forming dew at the surface of the heat exchanger (S250). Here, the being in standby for the second threshold time is due to a likelihood being present of the hardware configuration of the air conditioner 100 being damaged according to a thermal contraction and expansion when the freezing operation is performed without sufficient time having passed after the heat-up operation is ended.

After the pre-freezing operation is performed, the air conditioner 100 may control at least one from among the indoor fan 111 and the compressor 121 to perform the freezing operation for forming the ice-capsule at the surface of the heat exchanger (S260). After the freezing operation is performed, the air conditioner 100 may control at least one from among the indoor fan 111 and the compressor 121 to perform the defrosting operation for defrosting the ice-capsule (S270). Then, after the defrosting operation is performed, the air conditioner 100 may perform the second drying operation for drying the heat exchanger (S280).

Here, the 'second drying operation' may be an operation for drying the inside of the indoor unit 110 like the first drying operation, and the compressor may be in a stopped state without rotating at the second drying operation. However, a detailed operation of the second drying operation may vary with the first drying operation. Specifically, the second drying operation may be an operation for finishing the cleaning operation according to the disclosure, and may be performed for a longer time than the first drying operation because microbial growth such as mold and odor may be induced if condensed water that is remaining is not sufficiently removed.

Meanwhile, the second drying operation may be an operation in which the indoor fan 111 is rotated at a fourth RPM (fourth fan RPM) which is an RPM greater than the third fan RPM. A drying RPM according to the drying operation and an operation time may be set for the condensed water generated at the exterior and an inner surface of the indoor unit 110 to be effectively dried. Specifically, the drying RPM according to the second drying operation may be set to a maximum RPM of the indoor fan 111 for an effective defrosting and drying. Meanwhile, the RPM of the indoor fan 111 and the operation time according to the second drying operation may be determined according to the humidity in the space in which the indoor unit 110 is positioned.

Meanwhile, the drying RPM may not necessarily have to be maintained constantly while the second drying operation is being performed, and may be changed variously for an effective drying of the condensed water. For example, the second drying operation may be an operation that rotates the indoor fan 111 for 15 minutes at the pre-set maximum wind after having rotated the indoor fan 111 for 3 minutes at a pre-set minimum wind.

Meanwhile, the air conditioner 100 may control, like the first drying operation, a motor connected to the discharge port to block the discharge port from leaking smoke or an unpleasant odor to the space in which the user stays while performing at least one from among the heat-up operation, the pre-freezing operation, the freezing operation, the defrosting operation, and the second drying operation. Meanwhile, when it is preferable for the air conditioner 100 to open the discharge port for the adjustment of the indoor temperature, relative humidity, and the like, at least one from among the first drying operation, the heat-up operation, the pre-freezing operation, the freezing operation, the defrosting operation, and the second drying operation may be performed while the discharge port is in an open state.

In the above, the defrosting operation and the second drying operation according to the disclosure have been differentiated and described, but the defrosting operation may be implemented to include a plurality of defrosting steps including the second drying operation.

According to the one or more embodiments described above with reference to FIG. 2, by performing the drying operation or the standby operation in-between the heat-up operation and a series of freeze cleaning operations according to the disclosure, the air conditioner 100 may effectively remove contaminants attached to the surface of the heat exchanger, while effectively preventing the generation of smoke and odor due to the inside temperature of the indoor unit 110 changing suddenly, a likelihood of the hardware being damaged, and the like.

Figure 3:
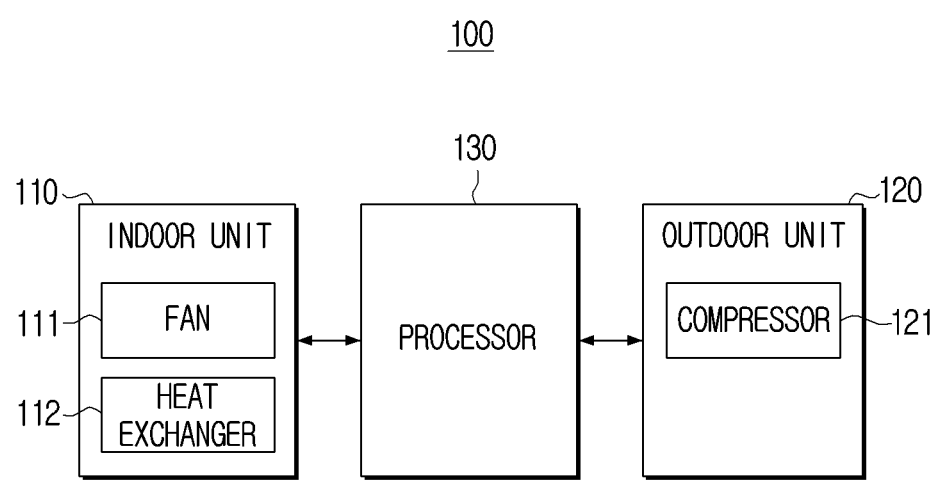
FIG. 3 is a block-diagram illustrating in brief a configuration of an air conditioner according to one or more embodiments.

FIG. 3 is a block-diagram illustrating in brief a configuration of the air conditioner 100 according to one or more embodiments.

As shown in FIG. 3, the air conditioner 100 according to one or more embodiments of the disclosure may include the indoor unit 110, the outdoor unit 120, and a processor 130. Further, the indoor unit 110 may include the indoor fan 111 and the heat exchanger 112, and the outdoor unit 120 may include the compressor 121. Because the indoor unit 110 and the outdoor unit 120 may include various configurations in addition to the configurations shown in FIG. 3, the above will be described with reference to FIG. 4 to FIG. 9.

The indoor fan 111 may suction air outside of the indoor unit 110 by rotation. Specifically, the indoor fan 111 may suction air outside the indoor unit 110 into the indoor unit 110 by a rotational force generated according to driving the motor connected to the indoor fan 111.

The indoor heat exchanger 112 may perform a heat exchange between air outside the indoor unit 110 suctioned by the rotation of the indoor fan 111 and a refrigerant. Specifically, the indoor heat exchanger 112 may be a heat exchanger of an F & Tube or Al material.

The compressor 121 may compress a low-temperature and low-pressure gaseous refrigerant, which is a working fluid, to a high-temperature and high-pressure gaseous refrigerant. Specifically, the compressor 121 may be an inverter compressor 121 of an RPM variable method.

The processor 130 may control the overall operation of the air conditioner 100. Specifically, the processor 130 may control the overall operation of the air conditioner 100 by being connected with various configurations of the air conditioner 100 such as, for example, and without limitation, the indoor fan 111, the indoor heat exchanger 112, the compressor 121, and the like as described above.

The processor 130 may be implemented in various methods. For example, the processor may be implemented as at least one from among an application specific integrated circuit (ASIC), an embedded processor, a microprocessor, a hardware control logic, a hardware finite state machine (FSM), and a digital signal processor (DSP). Meanwhile, in the disclosure, the term processor may be used as a meaning that includes a central processing unit (CPU), a graphic processing unit (GPU), a main processing unit (MPU), and the like.

The air conditioner 100 according to the disclosure may include a plurality of processors. Specifically, the air conditioner 100 may include a processor of the indoor unit 110 (indoor unit 110 processor) included in the indoor unit 110 and a processor of the outdoor unit 120 (outdoor unit 120 processor) included in the outdoor unit 120, and the indoor unit 110 processor and the outdoor unit 120 processor may be connected through the communicator. However, in describing the disclosure below, the term processor or at least one processor may be used as a term for collectively referring to when the processor is implemented in plurality, specifically, when the indoor unit 110 and the outdoor unit 120 respectively include the indoor unit 110 processor and the outdoor unit 120 processor, and the like.

Specifically, according to the various embodiments of the disclosure, the processor 130 may perform cleaning of the indoor heat exchanger 112 by controlling an operation based on the heat-up operation, the pre-freezing operation, the freezing operation, the defrosting operation, and the like according to the disclosure.

In one or more embodiments, the processor 130 may control at least one from among the indoor fan 111 and the compressor 121 to perform, based on the event for cleaning the indoor heat exchanger 112 being identified, the heat-up operation for increasing the temperature of the surface of the indoor heat exchanger 112, and perform the pre-freezing operation for forming dew at the surface of the indoor heat exchanger 112, control at least one from among the indoor fan 111 and the compressor 121 to perform the freezing operation for forming the ice-capsule at the surface of the indoor heat exchanger 112, and control the indoor fan 111 to perform the defrosting operation for defrosting the ice-capsule.

In the one or more embodiments, the processor 130 may identify, based on the indoor humidity detected through at least one sensor being greater than or equal to the pre-set threshold humidity (e.g., 60%), the event for cleaning the heat exchanger according to the disclosure as having occurred. In addition, the processor 130 may identify, based on an odor of a pre-set type being detected or a foreign material (e.g., mold) being detected inside the air conditioner 100 through the at least one sensor, the event for cleaning the heat exchanger according to the disclosure as having occurred.

In one or more embodiments, the processor 130 may perform the heat-up operation by controlling the compressor 121 and a cooling and heating switch valve 122, and in addition, the processor 130 may perform the heat-up operation by controlling the heater 113.

In one or more embodiments, the processor 130 may control for the indoor fan 111 to not rotate while the heat-up operation is being performed. In addition, the processor 130 may perform, based on the heat-up operation being ended, the pre-freezing operation after being in standby for the pre-set second threshold time.

In one or more embodiments, the processor 130 may perform the second drying operation for drying the indoor heat exchanger 112 after the defrosting operation is ended.

In addition to the above, the various embodiments as in the above-described embodiments and as described below with reference to FIG. 1 and FIG. 2 may be performed through a control process of the processor 130.

A configuration of the air conditioner 100 according to the disclosure may be described in greater detail below with reference to FIG. 4 to FIG. 9.

Figure 4:
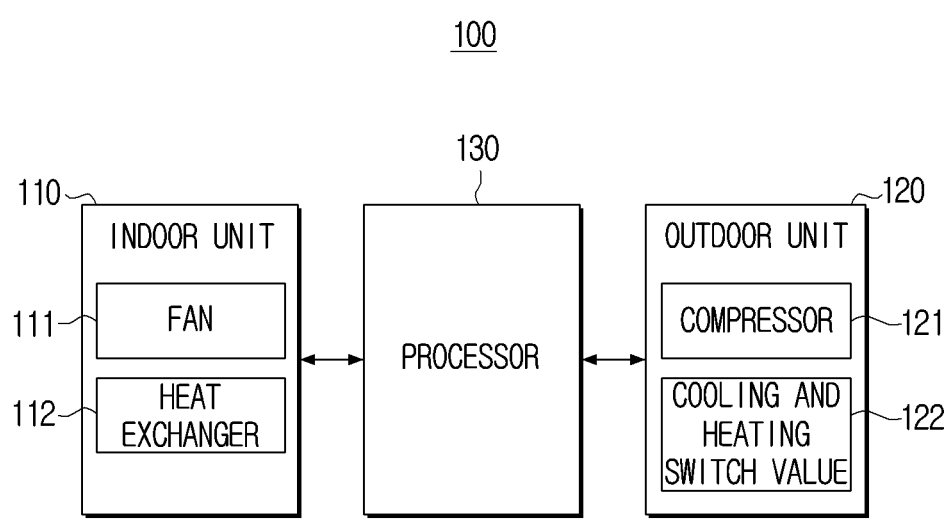
FIG. 4 and FIG. 5 are block-diagrams illustrating in detail a configuration of an air conditioner according to one or more embodiments.
Figure 5:
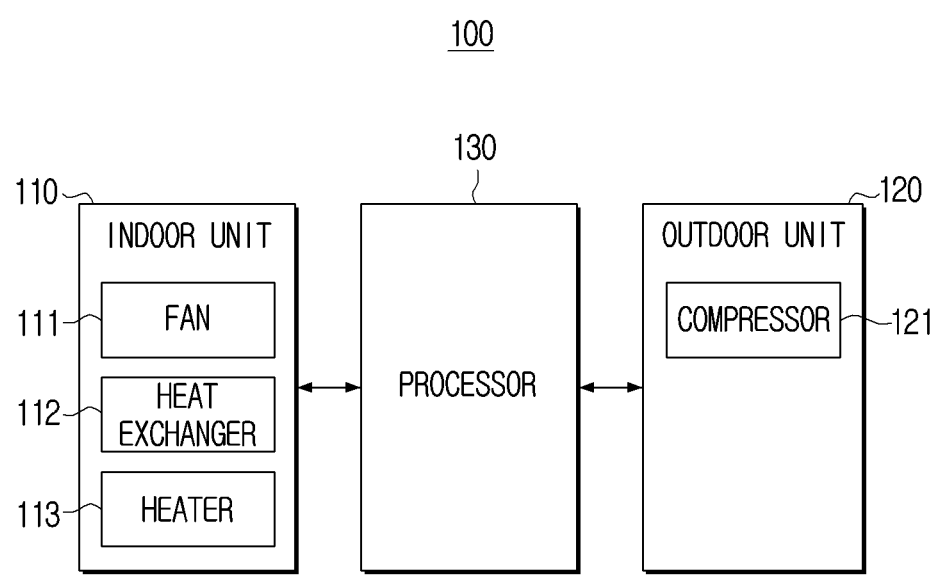
Figure 6:
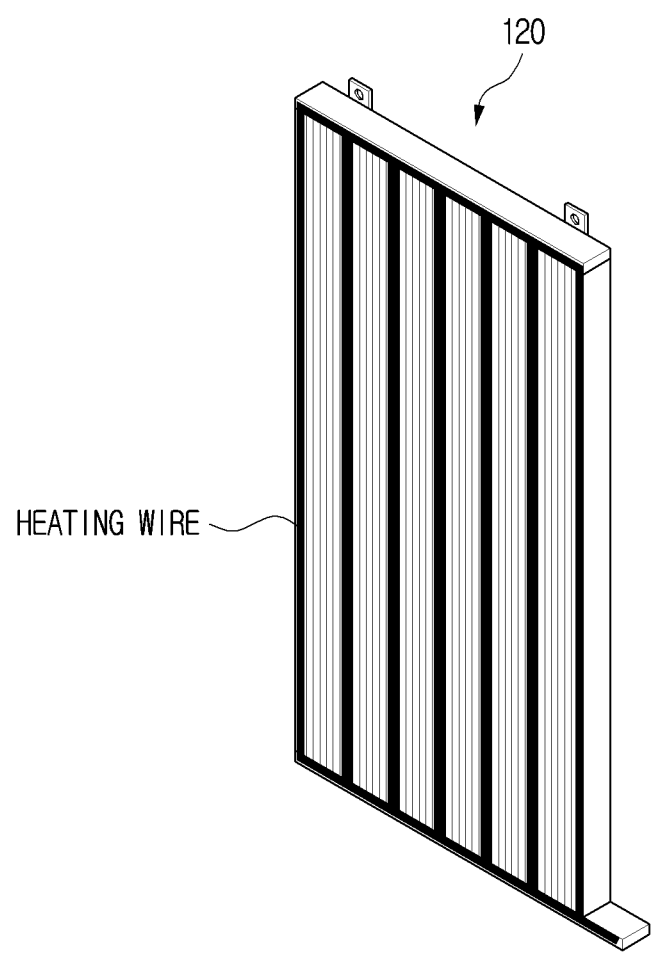
FIG. 6 and FIG. 7 are diagrams illustrating a heater according to one or more embodiments.
Figure 7:
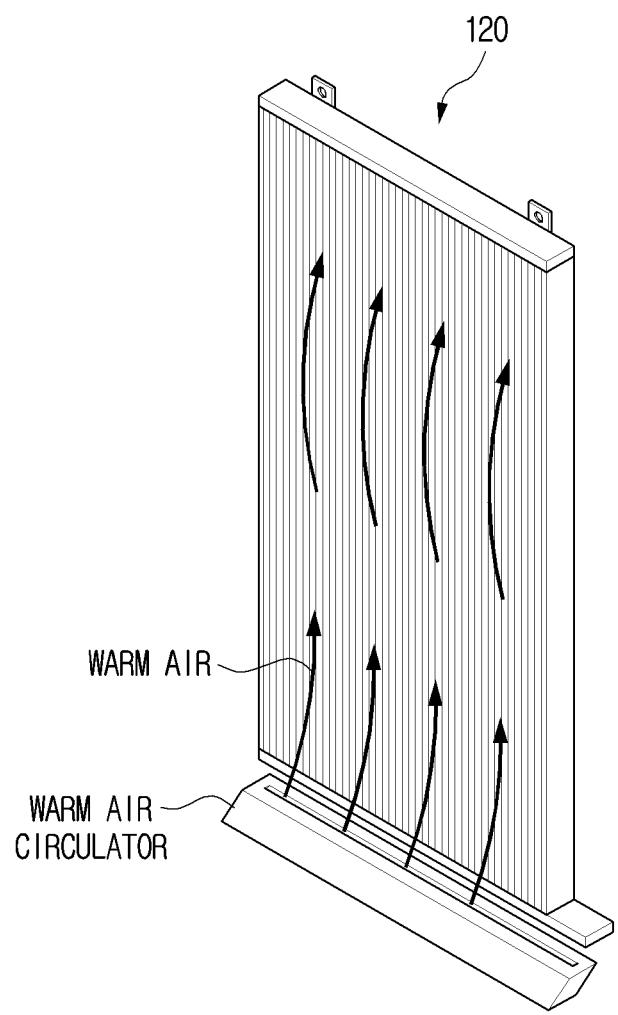

FIG. 4 and FIG. 5 are block-diagrams illustrating in detail a configuration of the air conditioner 100 according to one or more embodiments. Further, FIG. 6 and FIG. 7 are diagrams illustrating a heater according to one or more embodiments.

The air conditioner 100 according to the disclosure may be implemented such that not only the cooling operation but also the heating operation can be performed, and may be implemented such that the heating operation cannot be performed (i.e., only the cooling operation, the dehumidifying operation, and the like may be possible).

If the air conditioner 100 is implemented so as to perform even the heating operation, the air conditioner 100 may perform the heat-up operation for heating the indoor heat exchanger 112 by performing the heating operation. Alternatively, if the air conditioner 100 is implemented such that the heating operation cannot be performed, there may be a separate configuration for performing the heat-up operation according to the disclosure to be included in the air conditioner 100.

FIG. 4 shows a configuration of the air conditioner 100 when implemented so as to perform even the heating operation, and in this case, the outdoor unit 120 may further include the cooling and heating switch valve 122 for implementing cooling and heating. The cooling and heating switch valve 122 may refer to a valve that switches a flowing direction of the refrigerant by being closed at the cooling operation and being opened at the heat-up operation. For example, the cooling and heating switch valve 122 may be a 4-way valve, but is not limited thereto.

If the air conditioner 100 according to the disclosure includes the cooling and heating switch valve 122 in the outdoor unit 120, the air conditioner 100 may perform the heat-up operation by controlling the compressor 121 and the cooling and heating switch valve 122. Specifically, the air conditioner 100 may switch, based on performing the heating operation, a flow of refrigerant supplied to the indoor heat exchanger 112 of the indoor unit 110 and an outdoor heat exchanger of the outdoor unit 120 toward a direction opposite from when performing the cooling operation using the cooling and heating switch valve 122. Accordingly, the indoor heat exchanger 112 and the outdoor heat exchanger may respectively perform its roles as a condenser and an evaporator opposite from its respective roles at the cooling operation. Then, when the heating operation is performed, the indoor heat exchanger 112 may be heated accordingly.

FIG. 5 shows a configuration of the air conditioner 100 when implemented so as to not perform the heating operation, and in this case, the indoor unit 110 may further include the heater 113 for heating the indoor heat exchanger 112. For example, the heater 113 may include a heating wire attached to the indoor heat exchanger 112 as shown in FIG. 6, and include a warm air circulator disposed at a lower end of the indoor heat exchanger 112 as shown in FIG. 7.

If the air conditioner 100 according to the disclosure includes the heater 113 in the indoor unit 110, the air conditioner 100 may perform the heat-up operation according to the disclosure by controlling the heater 113. Specifically, if the heating wire is attached to the indoor heat exchanger 112, the air conditioner 100 may perform the heat-up operation by supplying power to the heating wire attached to the heat exchanger. Meanwhile, if the warm air circulator is disclosed at the lower end of the indoor heat exchanger 112, the air conditioner 100 may heat the indoor heat exchanger 112 by controlling the warm air circulator to flow the warm air to the indoor heat exchanger 112.

Meanwhile, the air conditioner 100 may heat the indoor heat exchanger 112 using an external apparatus which includes the warm air circulator. For example, if a robot communicable with the air conditioner 100 (e.g., robot cleaner, etc.) includes the warm air circulator, the air conditioner 100 may heat the indoor heat exchanger 112 by transmitting a control signal to the robot having the robot move close to the indoor heat exchanger 112 and then having it heat the indoor heat exchanger 112 of the air conditioner 100 through a warm air function. In addition, if the robot is implemented a small-type robot including the warm air circulator or the heater, the air conditioner 100 may heat the indoor heat exchanger 112 by transmitting a control signal for heating the indoor heat exchanger 112 to the robot while moving on the surface of the heat exchanger after the robot enters inside the indoor unit.

Figure 8:
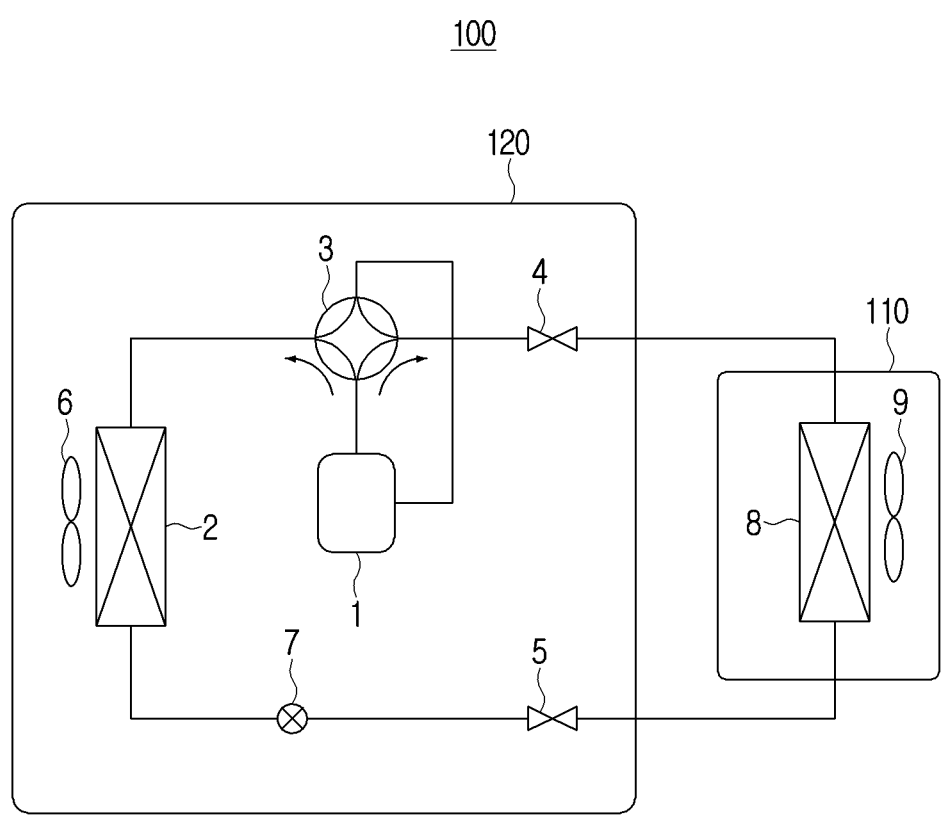
FIG. 8 is a diagram illustrating in detail a configuration for realizing a refrigerant cycle of an air conditioner.
Figure 9:
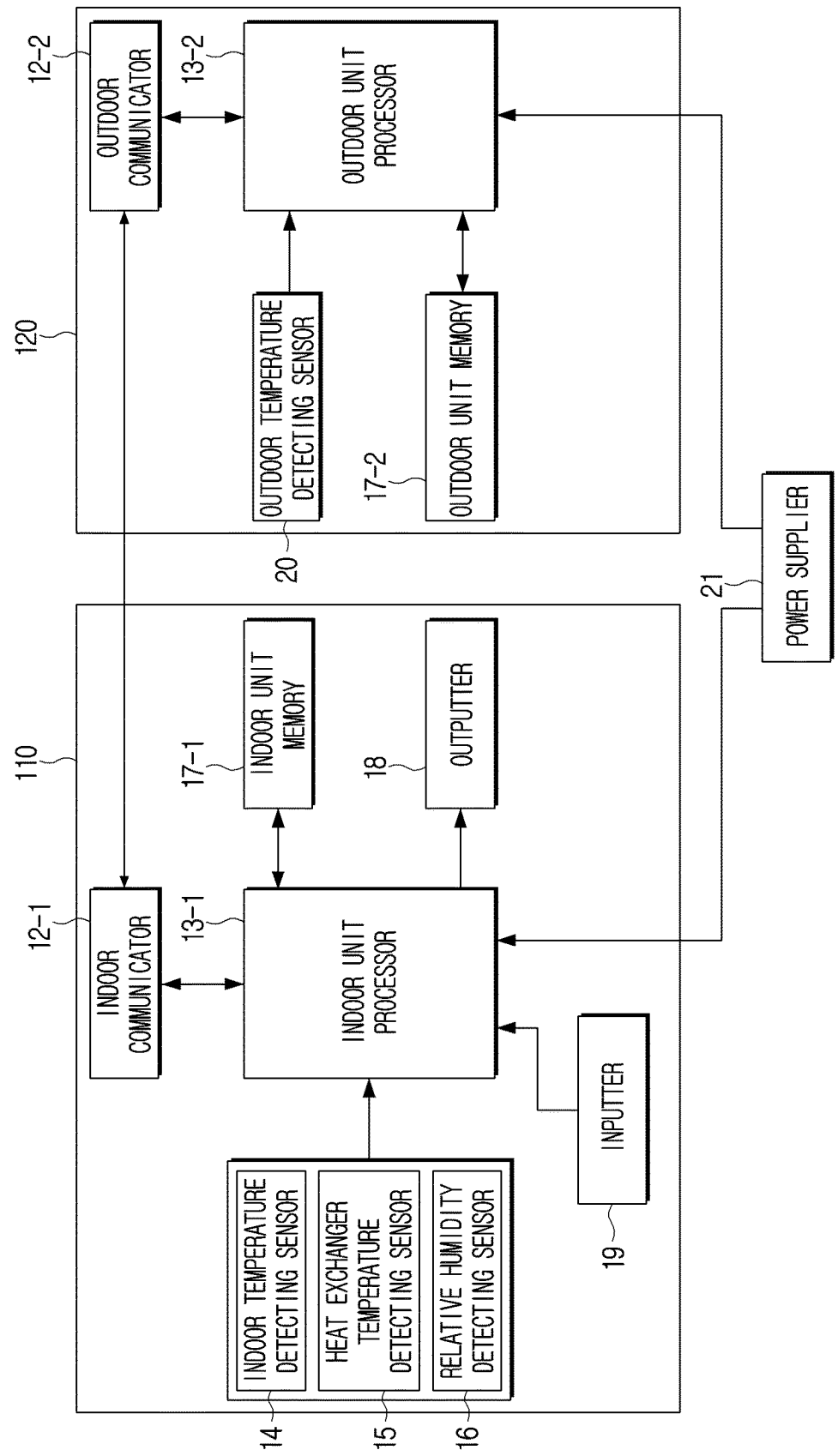
FIG. 9 is a diagram illustrating in detail a configuration for controlling an operation of an air conditioner.

FIG. 8 is a diagram illustrating in detail a configuration for realizing a refrigerant cycle of an air conditioner, and FIG. 9 is a diagram illustrating in detail a configuration for controlling an operation of an air conditioner.

If FIG. 3 to FIG. 5 are to mainly describe a configuration for describing one or more embodiments according to the disclosure from among the configurations of the air conditioner 100, FIG. 8 and FIG. 9 are for describing the configuration of the air conditioner 100 according to the disclosure in greater detail. In describing FIG. 8 and FIG. 9 below, detailed descriptions on configurations as described above in the description for FIG. 3 to FIG. 5 may be omitted.

As shown in FIG. 8, the air conditioner 100 may include the indoor unit 110 and the outdoor unit 120, and the indoor unit 110 may include an indoor heat exchanger 8 and an indoor fan 9. Then, the outdoor unit 120 may include a compressor 1, an outdoor heat exchanger 2, a 4-way valve 3, a low-pressure service valve 4, a high-pressure service valve 5, an outdoor fan 6, and an electronic expansion valve 7.

Specifically, the outdoor unit 120 may include the compressor 1 which compresses the low-temperature and low-pressure gaseous refrigerant, which is a working fluid, to the high-temperature and high-pressure gaseous refrigerant, the outdoor heat exchanger 2 which performs heat exchange with an external heat source, and the 4-way valve 3 which switches the flow of refrigerant to realize cooling and heating. Then, outdoor unit 120 may include the low-pressure service valve 4 and the high-pressure service valve 5 for fastening a connecting pipe between the indoor unit 110 and the outdoor unit 120. Meanwhile, the outdoor fan 6 may be disposed at a surrounding of the outdoor heat exchanger 2 for heat exchange between a refrigerant circulating within the outdoor heat exchanger 2 and external air to be carried out between each other effectively. Further, an electronic expansion valve (EEV) 7 may perform its role as an expansion device for controlling air flow.

The indoor unit 110 may include an indoor fan 9 which suctions air outside the indoor unit 110 by rotation, and an indoor heat exchanger 8 which performs heat exchange between the air outside the indoor unit 110 suctioned by the rotation of the indoor fan 9 and the refrigerant.

Meanwhile, as shown in FIG. 9, the indoor unit 110 may include an indoor communicator 12-1, an indoor unit processor 13-1, an indoor temperature detecting sensor 14, a heat exchanger temperature detecting sensor 15, a relative humidity detecting sensor 16, an indoor unit memory 17-1, an outputter 18, and an inputter 19.

Specifically, the indoor temperature detecting sensor 14 may detect the temperature of the space in which the indoor unit 110 is disposed, the heat exchanger temperature detecting sensor 15 may detect an indoor heat exchange temperature and temperature of an inlet and outlet of the indoor heat exchanger 8, and the relative humidity detecting sensor 16 may detect the relative humidity surrounding the indoor unit 110.

In the indoor unit memory 17-1, at least one command for controlling an operation of the indoor unit 110 and various information for controlling an operation of the indoor unit 110, specifically, information about temperature, humidity, and the like obtained through the sensor as described above may be stored. Further, the indoor unit processor 13-1 may control an operation of the indoor unit 110, and specifically, control an operation of the indoor unit 110 based on at least one command and various information stored in the memory. Specifically, the indoor unit processor 13-1 may include an indoor fan control module for controlling an operation and RPM of the indoor fan 9.

The outputter 18 may output various functions which can be performed by the air conditioner 100, and the outputter 18 may include at least one from among a display, a speaker, and an indicator.

Specifically, according to the various embodiments of the disclosure, the outputter 18 may output a notification showing that the operation for cleaning the indoor heat exchanger 8 according to the disclosure has started, a notification showing that the heat-up operation, the pre-freezing operation, the freezing operation, the defrosting operation, the first drying operation, the second drying operation, and the like according to the disclosure are in progress, a notification showing that each of the operations according to the disclosure have been ended, and furthermore, a notification showing that an error has occurred in the progress of the operations according to the disclosure.

The inputter 19 may receive a user command for controlling the air conditioner 100, and the inputter 19 may include at least one from among a microphone, a camera, and a remote controller receiver. Further, the inputter 19 may be implemented in a form included in a display as a touch screen.

Specifically, according to the various embodiments of the disclosure, the inputter 19 may receive the user command for cleaning the indoor heat exchanger 112. Furthermore, the inputter 19 may receive a command allowing for the user to directly control specific operations of the operations according to the disclosure. For example, the inputter 19 may receive a user command for temporarily stopping the freezing operation while the freezing operation is in progress.

Meanwhile, as shown in FIG. 9, the outdoor unit 120 may include an outdoor communicator 12-2, an outdoor unit processor 13-2, an outdoor temperature detecting sensor 20, and an outdoor unit memory 17-2.

Meanwhile, the outdoor temperature detecting sensor 20 may detect temperature of a space in which the outdoor unit 120 is disposed. The outdoor unit processor 13-2 may control an operation of the outdoor unit 120 based on at least one command and various information stored in the outdoor unit 120. Specifically, the outdoor unit processor 13-2 may include a compressor driving module for controlling an operation and RPM of the compressor 1, an outdoor fan control module for controlling an operation and RPM of the outdoor fan, a 4-way valve control module for controlling a flow of refrigerant for implementing cooling and heating, an expansion valve control module for adjusting air flow according to a predetermined condition, and the like, and perform an operation according to the corresponding module through each of the modules.

Meanwhile, the indoor communicator 12-1 and the outdoor communicator 12-2 may be respectively disposed at the indoor unit 110 and the outdoor unit 120 to perform communication between the indoor unit 110 and the outdoor unit 120. Then, supply of power for each of the configurations included in the indoor unit 110 and the outdoor unit 120 may be carried through a power supplier 21.

Figure 11:
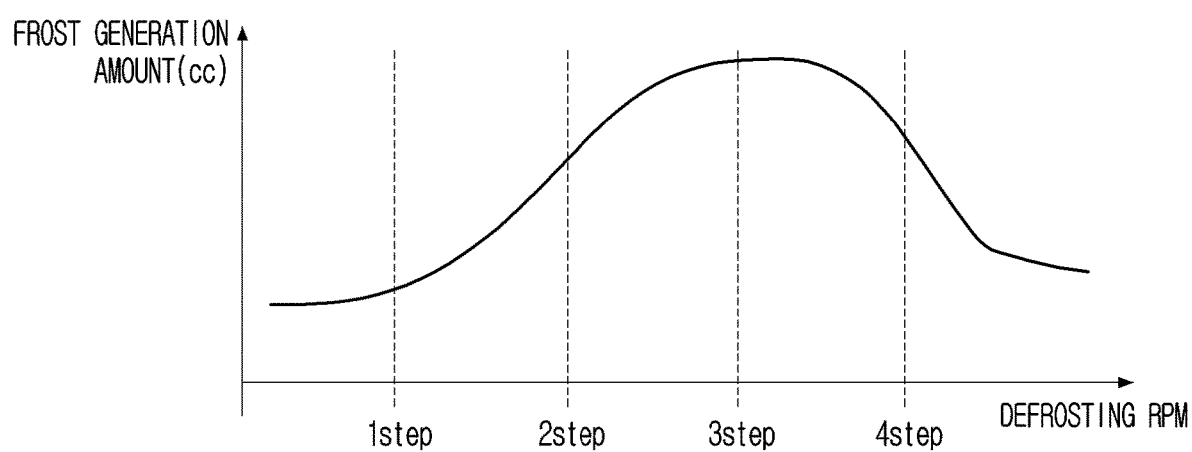

FIG. 10 and FIG. 11 are diagrams illustrating factors that can affect a decision in a freezing RPM according to the disclosure.

FIG. 10 is a graph showing a frost generation amount of ice-capsule, a discharge amount of condensed water, a freezing time, an amount of mist, and a thermal contraction and expansion noise according to an increase and decrease of the freezing RPM (including the first fan RPM and the second fan RPM).

Specifically, if the freezing RPM is set high, the frost generation amount of ice-capsule formed on the surface of the indoor heat exchanger 112 may be increased, and accordingly, there is an advantage of condensation amount discharged outside of the indoor unit 110 also increasing. In addition, if the freezing RPM is set high, a thermal contraction and expansion noise of a molded product which can be generated by sudden temperature change may be decreased.

However, if the freezing RPM is set high, freezing time may increase due to time spent for lowing until an optimal freezing point increasing, and a problem of the amount of mist generated in the indoor heat exchanger 112 by blown air of the indoor fan 111 during the freezing period also increasing may occur. Furthermore, if the freezing RPM is set excessively high, a problem of freezing itself not occurring may occur.

Alternatively, if the freezing RPM is set low, the freezing time may become shorter due to the time spent for lowering until the optimal freezing point decreasing, and the amount of mist generated in the indoor heat exchanger 112 by blown wind of the indoor fan 111 during the freezing period may decrease. However, if the freezing RPM is set low, there is a problem of the cleaning effect deteriorating due to the frost generation amount and condensed water discharge amount decreasing, and noise characteristic may also become worse due to a sudden fall in temperature.

FIG. 11 is a graph showing in greater detail a frost generation amount of ice-capsule according to an increase or decrease of freezing RPM.

As shown in FIG. 11, there is typically a tendency of the frost generation amount of ice-capsule also increasing as the time spent reaching the freezing point increases the more the freezing RPM increases, but if the freezing RPM increases by a specific freezing ROM (3 STEP) or more, there is, rather, a tendency of the frost generation amount of ice-capsule decreasing.

As described above with reference to FIG. 1, the range of the freezing RPM may be set taking into consideration a correlation between the various factors as shown in FIG. 10, and specifically, the second fan RPM of the freezing operation may be set based on the tendency as shown in FIG. 11.

Embodiments of the disclosure may provide a controlling method of an air conditioner including an indoor unit which includes an indoor heat exchanger and an indoor fan and an outdoor unit which includes a compressor, the method including performing, based on an event for cleaning the indoor heat exchanger being identified, a heat-up operation for increasing temperature of a surface of the indoor heat exchanger, controlling at least one from among the indoor fan and the compressor to perform a pre-freezing operation for forming dew at the surface of the indoor heat exchanger, controlling at least one from among the indoor fan and the compressor to perform a freezing operation for forming an ice-capsule at the surface of the indoor heat exchanger, and controlling the indoor fan to perform a defrosting operation for defrosting the ice-capsule.

The outdoor unit may include a cooling and heating switch valve for switching a direction to which a refrigerant flows, and the performing the heat-up operation may include performing the heat-up operation by controlling the compressor and the cooling and heating switch valve.

The indoor unit may include a heater for heating the indoor heat exchanger, and the performing the heat-up operation may include performing the heat-up operation by controlling the heater.

The controlling method of the air conditioner may further include performing, based on the heat-up operation being ended, the pre-freezing operation after being in standby for a pre-set second threshold time.

The controlling method of the air conditioner may further include performing a second drying operation for drying the indoor heat exchanger after the defrosting operation is ended.

The event may include at least one from among when humidity in a space in which the indoor unit is disposed is greater than or equal to a pre-set threshold humidity, when a foreign material inside the air conditioner is detected through at least one sensor included in the air conditioner, when an odor of a pre-set type is detected through the at least one sensor, and when a pre-set cleaning cycle has arrived.

A controlling method of the air conditioner 100 according to the above-described embodiments may be provided to the air conditioner 100 implemented as a program. Specifically, the program including the controlling method of the air conditioner 100 may be stored and provided in a non-transitory computer readable medium.

Specifically, in terms of a non-transitory computer-readable recording medium including a program which executes the controlling method of the air conditioner 100, the controlling method of the air conditioner 100 including the indoor unit 110 which includes the indoor heat exchanger 112 and the indoor fan 111 and the outdoor unit 120 which includes the compressor 121 may include performing, based on the event for cleaning the indoor heat exchanger 112 being identified, the heat-up operation for increasing the temperature of the surface of the indoor heat exchanger 112, controlling at least one from among the indoor fan 111 and the compressor 121 to perform the pre-freezing operation for forming dew at the surface of the indoor heat exchanger 112, controlling at least one from among the indoor fan 111 and the compressor 121 to perform the freezing operation for forming the ice-capsule at the surface of the indoor heat exchanger 112, and controlling the indoor fan 111 to perform the defrosting operation for defrosting the ice-capsule.

In the above, the controlling method of the air conditioner 100, and the computer-readable recording medium including the program which executes the controlling method of the air conditioner 100 have been briefly described, but the above is merely to omit redundant descriptions thereof, and the various embodiments of the air conditioner 100 may be applied to the controlling method of the air conditioner, and even to the computer-readable recording medium including the program which executes the controlling method of the air conditioner 100.

The machine-readable storage medium may be provided in the form of a non-transitory storage medium. Herein, 'non-transitory' merely means that the storage medium is a tangible device, and does not include a signal (e.g., electromagnetic waves), and the term does not differentiate data being semi-permanently stored or being temporarily stored in the storage medium. In an example, the 'non-transitory storage medium' may include a buffer in which data is temporarily stored.

According to one or more embodiments, a method according to the various embodiments described herein may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online (e.g., downloaded or uploaded) through an application store (e.g., PLAYSTORE™) or directly between two user devices (e.g., smartphones). In the case of online distribution, at least a portion of the computer program product (e.g., downloadable app) may be stored at least temporarily in the storage medium such as a server of a manufacturer, a server of an application store, or a memory of a relay server, or temporarily generated.

According to the various embodiments of the disclosure, the air conditioner 100 may able to effectively perform, by executing the freeze cleaning operation together with the heat-up operation, the cleaning of the heat exchanger. Specifically, according to the disclosure, mold may be effectively killed by performing the heat-up operation, and then, contaminants attached to the surface of the heat exchanger may be separated by freezing the heat exchanger and forming the ice-capsule, and then, the contaminants attached to the surface of the heat exchanger may be effectively removed by discharging the condensed water formed by defrosting the ice-capsule to the outside of the indoor unit 110.

Each of the elements (e.g., a module or a program) according to the various embodiments of the disclosure as described in the above may be formed as a single entity or a plurality of entities, and some sub-elements of the above-mentioned sub-elements may be omitted, or other sub-elements may be further included in the various embodiments. Alternatively or additionally, some elements (e.g., modules or programs) may be integrated into one entity to perform the same or similar functions performed by the respective elements prior to integration.

Operations performed by a module, a program, or another element, in accordance with the various embodiments, may be executed sequentially, in a parallel, repetitively, or in a heuristic manner, or at least some operations may be executed in a different order, omitted or a different operation may be added.

The term "part" or "module" used in the disclosure may include a unit formed of a hardware, software, or firmware, and may be used interchangeably with terms such as, for example, and without limitation, logic, logic blocks, components, circuits, or the like. "Part" or "module" may be a component integrally formed or a minimum unit or a part of the component performing one or more functions. For example, a module may be formed as an application-specific integrated circuit (ASIC).

The various embodiments of the disclosure may be implemented with software including instructions stored in a machine-readable storage media (e.g., computer). The machine may call an instruction stored in the storage medium, and as a device operable according to the called instruction, may include the air conditioner (e.g., air conditioner 100) according to the above-mentioned embodiments.

Based on the instruction being executed by the processor, the processor may directly or using other elements under the control of the processor perform a function corresponding to the instruction. The instruction may include a code generated by a compiler or executed by an interpreter.

While the disclosure has been illustrated and described with reference to various example embodiments thereof, it will be understood that the various example embodiments are intended to be illustrative, not limiting. It will be understood by those skilled in the art that various changes in form and details may be made therein without departing from the true spirit and full scope of the disclosure, including the appended claims and their equivalents.

What is claimed is:

1. An air conditioner, comprising:
   an indoor unit including an indoor heat exchanger and an indoor fan;
   an outdoor unit including a compressor; and
   a processor configured to, based on identification of an event occurring for cleaning the indoor heat exchanger:
   identify whether a pre-set threshold time has passed after a cooling operation or a dehumidifying operation is ended, and:
   based on the pre-set threshold time being identified as having passed, control a heat-up operation to be performed to increase a temperature of a surface of the indoor heat exchanger, or
   based on the pre-set threshold time being identified as not having passed, control a drying operation to be performed to dry the indoor heat exchanger, and then control the heat-up operation to be performed,
   control at least one from among the indoor fan and the compressor to perform a pre-freezing operation to form dew at the surface of the indoor heat exchanger,
   control at least one from among the indoor fan and the compressor to perform a freezing operation to freeze the dew formed at the surface of the indoor heat exchanger to form an ice-capsule at the surface of the indoor heat exchanger, and
   control the indoor fan to perform a defrosting operation to defrost the surface of the indoor heat exchange.

2. The air conditioner of claim 1, wherein
   the processor is configured to:
   control the indoor fan to not rotate while the heat-up operation is being performed.

3. The air conditioner of claim 1, wherein
   the processor is configured to:
   control the compressor to rotate at a first compressor revolution per minute (RPM) while the pre-freezing operation is being performed, and
   control the compressor to rotate at a second compressor RPM which is greater than the first compressor RPM while the freezing operation is being performed.

4. The air conditioner of claim 3, wherein
   the processor is configured to:
   control the indoor fan to rotate at a first fan RPM while the pre-freezing operation is being performed, and
   control the indoor fan to rotate at a second fan RPM which is less than the first fan RPM while the freezing operation is being performed.

5. The air conditioner of claim 1, wherein
   the outdoor unit includes a cooling and heating switch valve to switch a direction in which a refrigerant flows, and
   the processor is configured to:
   control the compressor and the cooling and heating switch valve to perform the heat-up operation.

6. The air conditioner of claim 1, wherein
   the indoor unit includes a heater to heat the indoor heat exchanger, and
   the processor is configured to:
   control the heater to perform the heat-up operation.

7. The air conditioner of claim 1, wherein
   the processor is configured to:
   based on the heat-up operation being ended, performing a standby operation for a pre-set threshold time before controlling the pre-freezing operation to be performed.

8. The air conditioner of claim 1, wherein
   the processor is configured to:
   perform a drying operation to dry the indoor heat exchanger after the defrosting operation is ended.

9. The air conditioner of claim 1, wherein
   the event includes at least one from among humidity in a space in which the indoor unit is disposed being greater than a pre-set threshold humidity, a foreign material inside the air conditioner being detected through at least one sensor in the air conditioner, an odor of a pre-set type being detected through the at least one sensor, and a pre-set cleaning cycle having arrived.

10. A method of controlling an air conditioner including an indoor unit including an indoor heat exchanger and an indoor fan, and an outdoor unit including a compressor, the method comprising:
- identifying an event occurring for cleaning the indoor heat exchanger;
- identifying whether a pre-set threshold time has passed after a cooling operation or a dehumidifying operation is ended, and
- based on the pre-set threshold time being identified as having passed, performing a heat-up operation to increase a temperature of a surface of the indoor heat exchanger; or
- based on the pre-set threshold time being identified as not having passed, performing a drying operation to dry the indoor heat exchanger, and then performing the heat-up operation;
- controlling at least one from among the indoor fan and the compressor to perform a pre-freezing operation to form dew at the surface of the indoor heat exchanger;
- controlling at least one from among the indoor fan and the compressor to perform a freezing operation to freeze the dew formed at the surface of the indoor heat exchanger to form an ice-capsule at the surface of the indoor heat exchanger; and
- controlling the indoor fan to perform a defrosting operation to defrost the surface of the indoor heat exchanger.

11. The method of claim 10, wherein
the performing the heat-up operation includes controlling the indoor fan to not rotate while the heat-up operation is being performed.

12. The method of claim 10, wherein
the controlling at least one from among the indoor fan and the compressor to perform the pre-freezing operation includes controlling the compressor to rotate at a first compressor revolution per minute (RPM) while the pre-freezing operation is being performed, and
the controlling at least one from among the indoor fan and the compressor to perform the freezing operation includes controlling the compressor to rotate at a second compressor RPM which is greater than the first compressor RPM while the freezing operation is being performed.

13. The method of claim 12, wherein
the controlling at least one from among the indoor fan and the compressor to perform the pre-freezing operation includes controlling the indoor fan to rotate at a first fan RPM while the pre-freezing operation is being performed, and
the controlling at least one from among the indoor fan and the compressor to perform the freezing operation includes controlling the indoor fan to rotate at a second fan RPM which is lesser than the first fan RPM while the freezing operation is being performed.

\* \* \* \* \*